United States Patent [19]

Herrick

[11] Patent Number: 4,559,219

[45] Date of Patent: Dec. 17, 1985

[54] REDUCING POWDER FORMATION IN THE PRODUCTION OF HIGH-PURITY SILICON

[75] Inventor: Carlyle S. Herrick, Alplaus, N.Y.

[73] Assignee: General Electric Company, Schenectady, N.Y.

[21] Appl. No.: 595,861

[22] Filed: Apr. 2, 1984

[51] Int. Cl.$^4$ .............................................. C01B 33/02
[52] U.S. Cl. .................................. 423/350; 423/348; 423/349
[58] Field of Search ................................. 423/348–350

[56] References Cited

U.S. PATENT DOCUMENTS

| 3,147,141 | 9/1964 | Ishizuka | 118/49.1 |
| 4,102,764 | 7/1978 | Harvey, II et al. | 423/348 |
| 4,125,643 | 11/1978 | Reuschel et al. | 423/349 |
| 4,147,814 | 4/1979 | Yatsurugi et al. | 472/51 |
| 4,150,168 | 4/1979 | Yatsurugi et al. | 427/51 |

FOREIGN PATENT DOCUMENTS

WO84/00353 2/1984 PCT Int'l Appl. ................ 423/348

OTHER PUBLICATIONS

J. Bloem; Journal of Crystal Growth 18, (1973), pp. 70–76.

Carlyle S. Herrick and David W. Woodruff, "The Homogenous Nucleation of Condensed Silicon in the Gaseous Si—H—Cl System", *J. of the Electrochemical Society*, vol. 131, No. 10, Oct. 1984, pp. 2417-2422.

*Primary Examiner*—John Doll
*Assistant Examiner*—Jackson Leeds
*Attorney, Agent, or Firm*—Richard J. Traverso; James C. Davis, Jr.; James Magee, Jr.

[57] ABSTRACT

A method of manipulating the rate of homogeneous nucleation of silicon as either a particulate solid or liquid settling out of the gaseous phase during the pyrolysis of silane homologs by controlling the quantity of halogen within the pyrolysis medium. The rate of homogeneous nucleation can be maintained sufficiently low (below 1 silicon nucleus/cm$^3$/sec) so as to avoid power formation with a minimum amount of halogen.

22 Claims, 11 Drawing Figures 4,559,219

REDUCING POWDER FORMATION IN THE PRODUCTION OF HIGH-PURITY SILICON

BACKGROUND OF THE INVENTION

This invention relates to methods of manufacturing high-purity silicon by pyrolysis of silane homologs. More particularly, this invention concerns a method of manipulating the homogeneous nucleation of particulate solid and liquid silicon in the gaseous phase during the pyrolysis of silane homologs by controlling the quantity of halogen within the pyrolysis medium.

High-purity silicon is used extensively in the semiconductor industry for transistors and integrated circuits. A well-established process for producing high-purity silicon is to pyrolyze gaseous silane homologs having the formula $SiY_4$ with hydrogen at high temperatures; pyrolysis being the application of enough heat to effect or cause a rapid approach to chemical equilibrium in the initial gas or gas mixture. The term silane homologs as used herein refers to those compounds wherein Y is independently selected from the group consisting of hydrogen, fluorine, chlorine, bromine and iodine. More common silane homologs include silane ($SiH_4$), silicon tetrachloride ($SiCl_4$), dichloro-silane ($SiH_2Cl_2$), trichloro-silane ($SiHCl_3$), chloro-silane ($SiH_3Cl$), etc. A pyrolysis reaction is used in processes which provide both silicon in polycrystalline form as well as thin films of silicon in both polycrystalline form and monocrystalline form (epitaxial growth). To obtain useful, high purity silicon from a pyrolysis reaction, it is necessary to grow silicon crystals on a surface. Pyrolysis is initiated on a carrier, which is typically solid silicon but can be other materials such as tantalum, platinum, etc. Crystal growth continues on the silicon surface as formed. Representative examples of commercial processes which employ a pyrolysis reaction to produce high purity silicon are disclosed in U.S. Pat. Nos. 3,099,534, 3,011,877, 3,053,638 and 3,147,141 and are incorporated by reference. Pyrolysis can occur at temperatures above 500° C. (about 773 Kelvin). However, temperatures ranging from 900° to 1200° C. (1173–1473 Kelvin) are often utilized in commercial processes. Pyrolyzing $SiCl_4$ and $SiHCl_3$ at these temperatures produces a desirable, void-free silicon deposit, either in polycrystalline form or monocrystalline form. Pyrolyzing $SiH_4$, $SiH_3Cl$ and $SiH_2Cl_2$ gives higher yields of silicon than $SiCl_4$ and $SiHCl_3$ at these temperatures and the same Cl/H ratio in the feedstock but also produces a fine powder of particulate silicon in both the manufacture of polycrystalline silicon and epitaxial growth (polycrystal and monocrystal). This silicon powder has significant deleterious effects on the product quality of the silicon deposit. The powdered silicon often comingles with the growing crystals on the surface of solid silicon which may disrupt growth patterns, introduce crystallographic imperfections or form rough surfaces, thus reducing the quality of the latter by increasing the surface area and reducing its density. Production of powdery silicon is also undesirable since there is significant quantity of starting material wasted.

Silicon powder formation is believed to result from the homogeneous nucleation of silicon in the gaseous phase during pyrolysis of silane homologs at temperatures below the melting point of silicon. In contrast, useful, high-purity silicon is obtained from the heterogeneous nucleation of silicon on a surface, not from homogeneous nucleation. Homogeneous nucleation of silicon in the gaseous phase occurs during the pyrolysis of all silane homologs either as a solid or liquid, depending on the pyrolysis temperature, under substantially all reaction conditions. However, homogeneous nucleation does not pose a problem at rates below 1 silicon nulceus/cm$^3$/sec. This value is often characterized as the "onset rate" since powder formation is considered insignificant at rates below this value.

The rates of homogeneous nucleation and heterogeneous nucleation are known to vary with the silane homolog utilized, the temperature utilized and the concentration of silane homologs in the pyrolysis feedstock. As discussed above, the pyrolysis of $SiCl_4$ and $SiHCl_3$ does not cause significant powder formation in existing processes. This is due to rates of homogeneous nucleation in the gaseous phase below 1 silicon nucleus/cm$^3$/sec at conventional process conditions. The rates of homogeneous nucleation in the gaseous phase for $SiH_4$, $SiH_3Cl$ and $SiH_2Cl_2$ are high under similar process conditions (temperature, concentration) and cause significant powder formation during pyrolysis. The production of silicon in the gaseous phase during pyrolysis of these three silane homologs can be reduced by reducing the temperature and concentration. However, yields of high-purity silicon from heterogeneous nucleation are also reduced.

Due to the high yields of crystalline silicon obtained from pyrolyzing $SiH_4$ at high temperatures and concentrations, attempts have been made to reduce the rate of homogeneous nucleation of silicon in the gaseous phase for $SiH_4$ under these conditions. Some attempts have been directed to modifications of the apparatus utilized for pyrolysis of the silane homologs, as disclosed in U.S. Pat. Nos. 4,150,168, 3,147,141, 4,147,814. In the article "High Chemical Vapor Deposition Rates of Epitaxial Silicon Layers", J. Crystal Growth, V. 18, 1973, pages 70–76; Bloem discloses that the addition of hydrogen chloride to a pyrolysis feedstock of hydrogen and $SiH_4$ increases the deposition rate when producing high-purity silicon in monocrystalline form and suggests that the increases in deposition rates are due to a reduction in homogeneous nucleation of silicon in the gaseous phase. However, adding HCl to the feedstock also increases the etching of the crystalline silicon produced. Yields of high-purity silicon can be reduced if the proper quantity of HCl is not introduced. Direction as to how to reduce the production of silicon in the gaseous phase during the pyrolysis of silane homologs below the onset rate (one silicon nucleus/cm$^3$/sec) with a minimization of etching is still needed in the industry.

Applicant has discovered a number of species other than HCl which effect the homogeneous nucleation of particulate solid and liquid silicon in the gaseous phase during pyrolysis of silane homologs. Methods of utilizing these species (and HCl) to reduce the homogeneous nucleation of particulate solid and liquid silicon in the gaseous phase below the onset rate are provided. Included within these processes are embodiments which provide a minimum degree of etching.

SUMMARY OF THE INVENTION

This invention provides methods of manipulating the rate of homogeneous nucleation of particulate solid and liquid silicon in the gaseous phase during pyrolysis of silane homologs by controlling the quantity of halogen, in any form, within a feedstock of silane homologs and pyrolyzing the silane homologs within said feedstock having the controlled quantity of halogen. The quantity of halogen within said feedstock is controlled by the addition or removal of one or more members of the group consisting of $X_2$, HX, $SiHX_3$, $SiX_4$, $SiH_2X_2$, $SiH_3X$, $SiH_4$ and $H_2$, wherein X is halogen.

This invention also provides methods of decreasing the rate of homogeneous nucleation of particulate solid and liquid silicon in the gaseous phase during the pyrolysis of silane homologs and hydrogen mixtures thereof. This is accomplished by addition of halogen to the feedstock of silane homologs in the form of one or more members of the group consisting of HX, $X_2$, $SiX_3H$ and $SiX_4$, wherein X is halogen.

Additionally, this invention provides embodiments which reduce the homogeneous nucleation of particulate solid and liquid silicon in the gaseous phase to 1 silicon nucleus/cm$^3$/sec and less when pyrolyzing $SiH_4$, $SiH_3X$, $SiH_2X_2$ and mixtures thereof, wherein X is halogen, and embodiments which obtain the rate of gaseous silicon production with a minimization of etching. This is accomplished by diluting the silane homologs with hydrogen, adding halogen in the form of HCl, HF, $Cl_2$, $F_2$, $SiF_4$, $SiCl_4$, $SiHF_3$ or $SiHCl_3$ to said feedstock and selecting a pyrolysis temperature within the range of 800-3000 Kelvin which corresponds to loci on or outside of the corresponding curve provided in the drawing.

OBJECTS OF THE PRESENT INVENTION

An object of the present invention is to provide new species which reduce the homogeneous nucleation of particulate solid and liquid silicon in the gaseous phase during the pyrolysis of silane homologs.

Another object of the present invention is to reduce silicon powder formation during the manufacture of bulk silicon by a heterogeneous reaction.

Another object of the present invention is to reduce the homogeneous nucleation of particulate solid and liquid silicon in the gas phase during the pyrolysis of $SiH_4$, $SiH_2Cl_2$, $SiH_3Cl$ and mixtures thereof.

Another object of the present invention is to reduce the homogeneous nucleation of particulate solid silicon in the gaseous phase from the pyrolysis of silane homologs without requiring the use of special equipment.

Another object of the present invention is to reduce the homogeneous nucleation of particulate solid and liquid silicon in the gaseous phase to 1 silicon nucleus/cm$^3$/sec and less when pyrolyzing $SiH_4$, $SiH_3X$, $SiH_2X_2$ and mixtures thereof.

Another object of the present invention is to reduce the homogeneous nucleation of particulate solid and liquid silicon in the gaseous phase to 1 silicon nucleus/cm$^3$/sec with a minimum degree of etching during the pyrolysis of silane homologs.

DETAILED DESCRIPTION OF THE PREFERRED EMBODIMENTS

Figure 1:
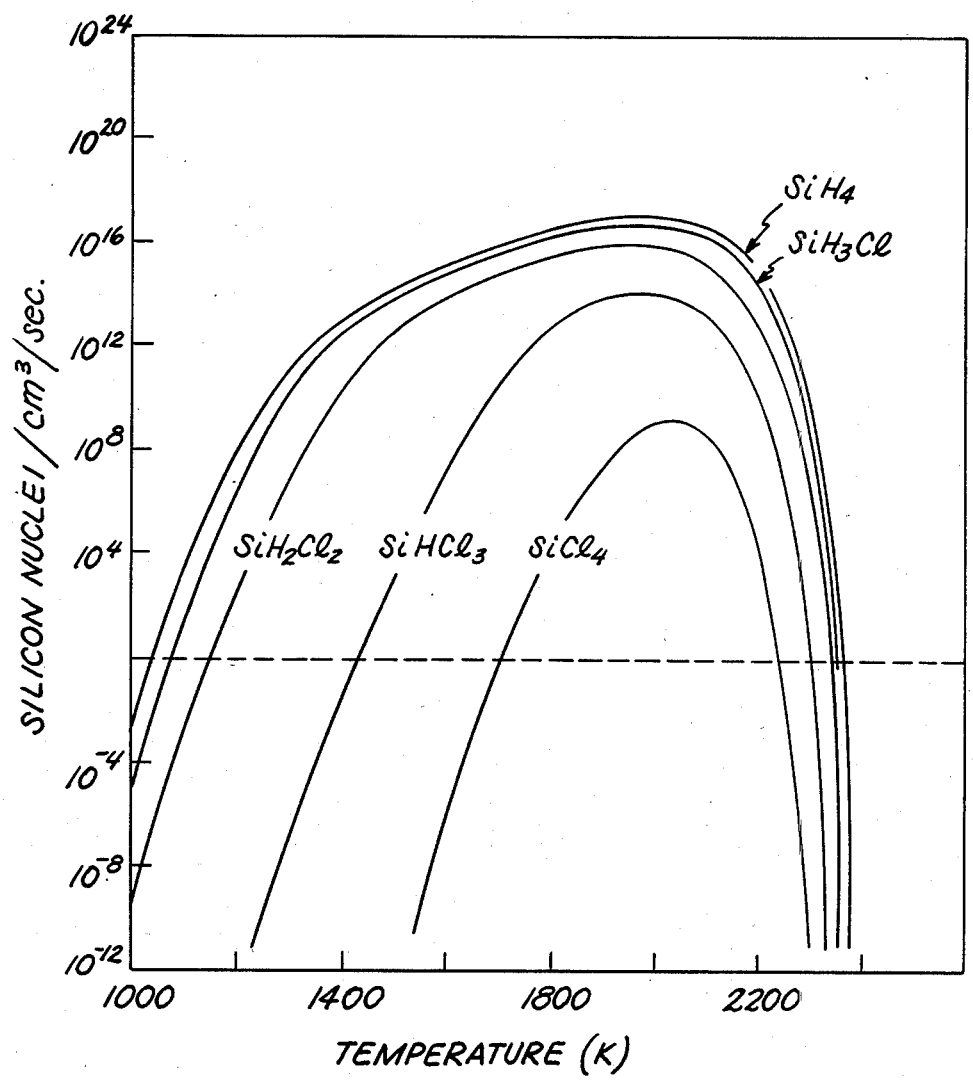
FIG. 1 is a plot of the rate of silicon nuclei formation versus temperature for various silane homologs at a concentration of 1 mole %.

The homogeneously nucleated silicon produced during the pyrolysis of silane homologs is either in particulate solid or liquid form, depending on the pyrolysis temperature. At pyrolysis temperatures above the melting point of silicon, the homogeneously nucleated silicon is a liquid and at pyrolysis temperatures below the melting point of silicon the homogeneously nucleated silicon is a solid.

Homogeneously nucleated silicon within the pyrolysis medium does not exist in both the liquid and solid phase simultaneously. When the phrase "the homogeneous nucleation of particulate solid and liquid silicon" is utilized in this description and in the claims, it is intended to refer to both forms (solid and liquid) of homogeneously nucleated silicon. It is not intended to suggest that both forms occur simultaneously during pyrolysis.

The rate of homogeneous nucleation of particulate solid and liquid silicon in the gas phase is manipulated by controlling the concentration of halogen in a feedstock of silane homologs and pyrolyzing the silane homologs within said feedstock. The halogen concentration can be controlled by addition or removal of halogen in any form. This is permissible due to the high temperatures and strong reducing atmosphere which is characteristic of the pyrolysis reaction. However, to avoid the introduction of impurities to the surface of the silicon product desired and to avoid an unusual imbalance of the silicon/hydrogen/halogen equilibrium during pyrolysis, it is preferable to limit the species added or removed from the feedstock to members of the group consisting of $Cl_2$, $Br_2$, $I_2$, $F_2$, HCl, HBr, HI, HF, $SiH_4$, $SiH_3Cl$, $SiH_3Br$, $SiH_3I$, $SiH_3F$, $SiH_2Cl_2$, $SiH_2Br$, $SiH_2I_2$, $SiH_2F_2$, $SiHCl_3$ $SiHBr_3$, $SiHI_3$, $SiHF_3$, $SiCl_4$, $SiBr_4$, $SiI_4$, $SiF_4$ and $H_2$. Although the species $H_2$ and $SiH_4$ contain no halogen, addition or removal of these species will effect the halogen concentrations in the Si/H/halogen system. It is the addition or removal of these species from the feedstock which controls the homogeneous nucleation of particulate solid and liquid silicon in the gaseous phase (silicon powder) during the pyrolysis of silane homologs.

The effectiveness each halogen has on manipulating the homogeneous nucleation rate decreases in the following order; fluorine, chlorine, bromine, iodine. To maintain better control over the homogeneous nucleation rate, it is preferable to add or remove only one of the halogens to the feedstock. Chlorine-containing species are preferred because they are readily available. Due to the nature of the pyrolysis reaction, no particular halogen-containining species of the group defined above is preferred for adding or removing a particular halogen to the feedstock. A feedstock which contains a particulate Si/H/Cl atomic composition will provide a rate of homogeneous nucleation of particulate solid or liquid silicon in the gase phase independent of the materials introduced into the feedstock to provide this Si/H/Cl atomic composition. In addition, a change in the Si/H/Cl atomic composition of a feedstock will effect the rate of homogeneous nucleation independent of the species utilized to bring about this change in composition. However, a particular species may be preferred for introducing or removing a particular halogen for reasons other than the effect on the production on silicon in the gas phase. For example, certain species may be readily available, cheaper to use, contain fewer impurities, etc.

It is obvious that certain changes in the feedstock cannot be obtained with some of the species defined in the group above. For example, $SiCl_4$, $Cl_2$, HCl and $SiHCl_3$ cannot increase the Si/Cl ratio of a feedstock consisting of $SiH_4$, $SiH_3Cl$ and $SiH_2Cl_2$. Particular combinations of species may be preferred in the commercial production of high purity silicon.

The homogeneous nucleation of particulate solid and liquid silicon in a gas phase during the pyrolysis of silane homologs is dependent on factors other than the halogen content of the feedstock; such as the pyrolysis temperature, the composition of the feedstock and the concentration of silane homologs in said feedstock. The dependence of the rate of homogeneous nucleation on the pyrolysis temperature is illustrated in FIG. 1, which is a plot of pyrolysis temperature versus the rate of homogeneous nucleation of particulate solid and liquid silicon in the gaseous phase for various silane homologs at a feedstock concentration of 1 mole %. These curves were obtained from the calculations described below under "Experimental".

The horizontal dashed line in FIG. 1 highlights the rate of homogeneous nucleation equal to 1 silicon nucleus/$cm^3$/sec. FIG. 1 demonstrates that a slight change in temperature will significantly effect the rate of homogeneous nucleation. For example, an increase in pyrolysis temperature from 1100 Kelvin to 1200 Kelvin can increase the rate of homogeneous nucleation for $SiH_4$ about 100,000 fold at a concentration of 1 mole percent of feedstock.

Figure 2:
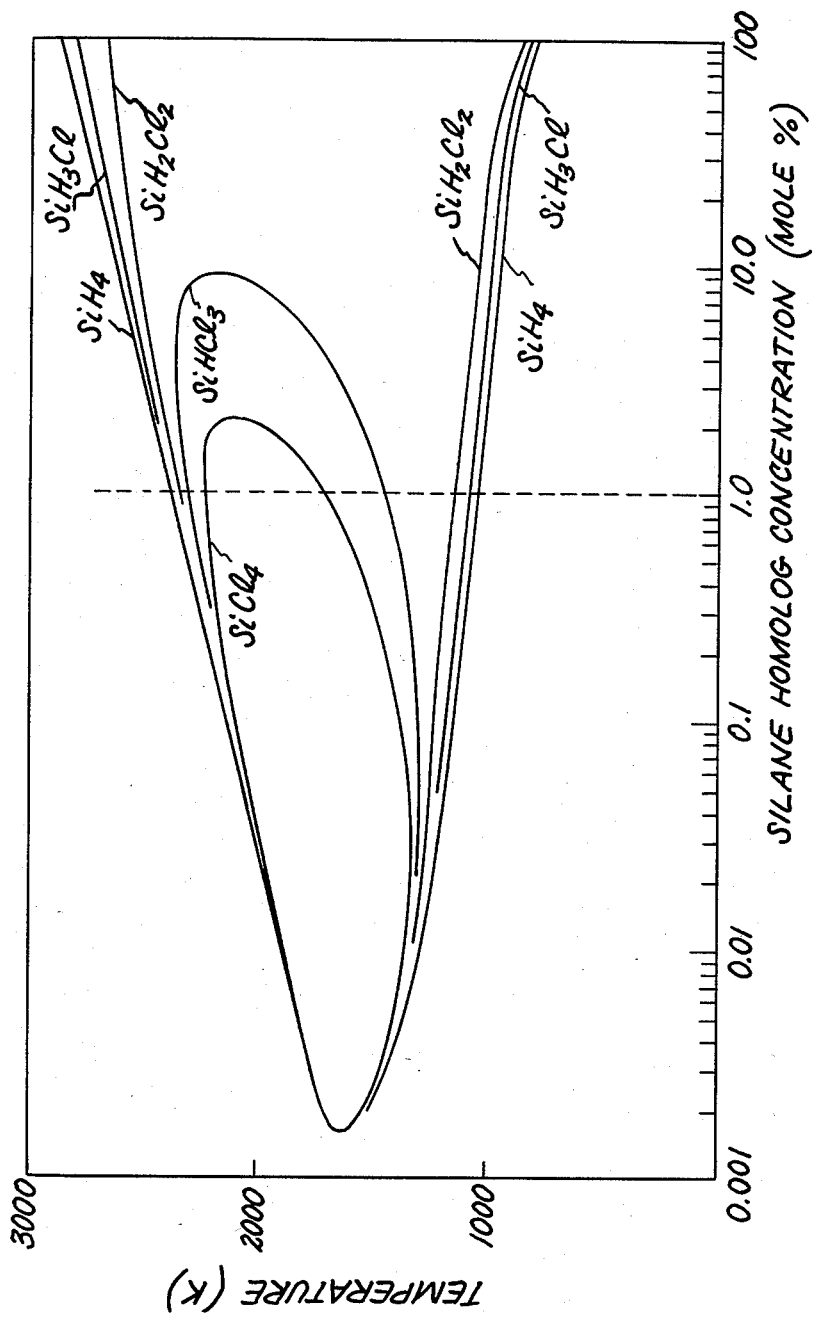
FIG. 2 is a plot of loci at which the homogeneous nucleation rate is 1 silicon nucleus/cm$^3$/sec for various silane homologs at different temperatures and concentrations.

FIG. 2 illustrates the effect both the silane homolog concentration and pyrolysis temperature have on the rate of homogeneous nucleation of particulate solid and liquid silicon in the gas phase during pyrolysis. The curves in FIG. 2 comprise the points at which the rate of homogeneous nucleation is equal to the "onset rate". These curves were obtained by determining what temperatures and concentrations would provide a value of 1 for the equation described below under "Experimental". Points of FIG. 2 which intercept the vertical-dashed-line, correspond to points of FIG. 1 which fall on the horizontal-line therein. The remainder of the points of FIG. 1 do not occur in the curves of FIG. 2. These points either project or recess from the two dimensional plane of FIG. 2, where a third axis represents the rate of homogeneous nucleation of particulate solid and liquid silicon in the gaseous phase.

Where there are two temperatures at which the homogeneous nucleation rate is equivalent to the onset rate for a particular concentration of silane homolog, the homogeneous nucleation rate is greater than the onset rate for temperatures between these points. For temperatures which fall outside these two points, the homogeneous nucleation rate is less than the onset rate. For a particular concentration of silane homolog, the homogeneous nucleation rate increases and decreases as illustrated in FIG. 1, with the rate maximizing at a temperature between the two values on the curve in FIG. 2.

FIGS. 1 and 2 suggest that the homogeneous nucleation rate is dependent on the quantity of halogen within the feedstock. FIG. 1 shows that the homogeneous nucleation rate decreases as the quantity of halogen within the silane homolog increases. FIG. 2 illustrates that the operating zone wherein the homogeneous nucleation rate is greater than the onset rate is reduced as the silane homologs in the feedstock contain more halogen.

The data in FIGS. 3–10 confirm this suggestion and illustrate that the rate of homogeneous nucleation of particulate solid and liquid silicon in the gaseous phase can be manipulated by controlling the quantity of halogen within the feedstock. Each curve in FIGS. 3–10 corresponds to a particular feedstock composition. The loci comprising these curves correspond to pyrolysis temperatures and quantities of halogen within the feedstock which provide a rate of homogeneous nucleation equal to the onset rate. The quantity of halogen within the feedstock is represented as the mole % of a halogen containing species within the feedstock. Points within the curves provide rates of homogeneous nucleation of particulate solid and liquid silicon in the gas phase greater than the onset rate. Points outside the curves provide a rate of homogeneous nucleation less than the onset rate. These curves were obtained by determining which values for feedstock concentration, pyrolysis temperature and halogen content would provide a homogeneous nucleation rate equal to the onset rate by the equations described below in "Experimental". Temperatures for the loci on the Y axis correspond to points in FIG. 1 and FIG. 2 since the quantity of halogen is too small to have a significant effect on the production of gas phase silicon. The curves indicate the changes in the two temperatures at which the rate of homogeneous nucleation is equivalent to the onset rate for a particular feedstock composition. These temperature changes reflect an increase or decrease in the rate of homogeneous nucleation. An increase in the lower temperature and a decrease in the higher temperature correspond to a decrease in the homogeneous nucleation of particulate solid or liquid silicon in the gas phase. Conversely, a decrease in the lower temperature and an increase in the upper temperature corresponds to an increase in the rate of homogeneous nucleation. The dotted line provided in FIGS. 3–6 marks the division between the upper and lower temperatures and also indicates the temperature where the homogeneous nucleation rate is maximized for a particular halogen concentration.

As can be seen from FIGS. 3-10, the rate of homogeneous nucleation of particulate solid and liquid silicon in the gas phase during the pyrolysis silane homologs can be manipulated up or down by controlling of halogen within the feedstock. Adding halogen to a feedstock will decrease the homogeneous nucleation rate under most conditions. However, there are a significant number of exceptions. For example, at temperatures above 1700 Kelvin, additions of halogen in the form of $SiX_4$ and $SiHX_3$ (where X is halogen) increase the homogeneous nucleation rate where the concentration of silane homologs within the feedstock is small. In addition, at temperatures below 1700 Kelvin additions of halogen in the form of $SiHX_3$ in concentrations greater than 30 mole % of the feedstock increase the homogeneous nucleation rate. Finally, feedstocks principally comprised of $SiX_4$ and $SiHX_3$ (where X is halogen) will experience an increase in the homogeneous nucleation of liquid silicon in the gas phase at pyrolysis temperatures above 1700 Kelvin upon addition of halogen in any form. This includes HI, HBr, HF, HCl, $Cl_2$, $Br_2$, $F_2$, $I_2$, and $SiHX_3$ and $SiX_4$ where X is halogen and the addition of such a species would decrease the Si/Cl ratio.

The quantity of halogen within the feedstock can be controlled by adding and removing a halogen containing species in the form of one or more members of the group consisting of HI, HBr, HF, HCl, $Cl_2$, $Br_2$, $F_2$, $I_2$, $SiX_4$ and $SiHX_3$ (where X is halogen). The quantity of halogen can also be controlled by adding or removing a member of the group consisting of $H_2$, $SiH_4$, $SiH_3X$ and $SiH_2X_2$. Addition of one or more of these four species to a feedstock serves to dilute the halogen concentration within the feedstock, which has the same effect as removing halogen from the feedstock directly. Removal of one or more of these species from the feedstock increases the concentration of halogen within the feedstock and is equivalent to an addition of halogen directly to the feedstock. It should be noted that although the species $SiH_3X$ and $SiH_2X_2$ contains halogen atoms, the relatively small quantity of halogen displaces the equilibrium in the gas phase a small amount during the pyrolysis of silane homologs.

Figure 8:
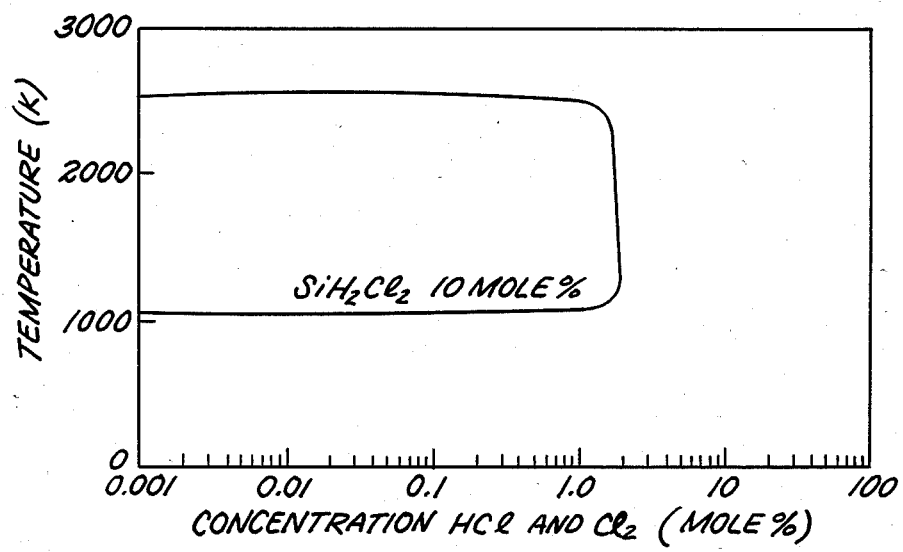
FIG. 8 is a plot of loci at which the homogeneous nucleation is 1 silicon nucleus/cm$^3$/sec for $SiH_2Cl_2$ at different temperatures and concentrations of added HCl and $Cl_2$.
Figure 9:
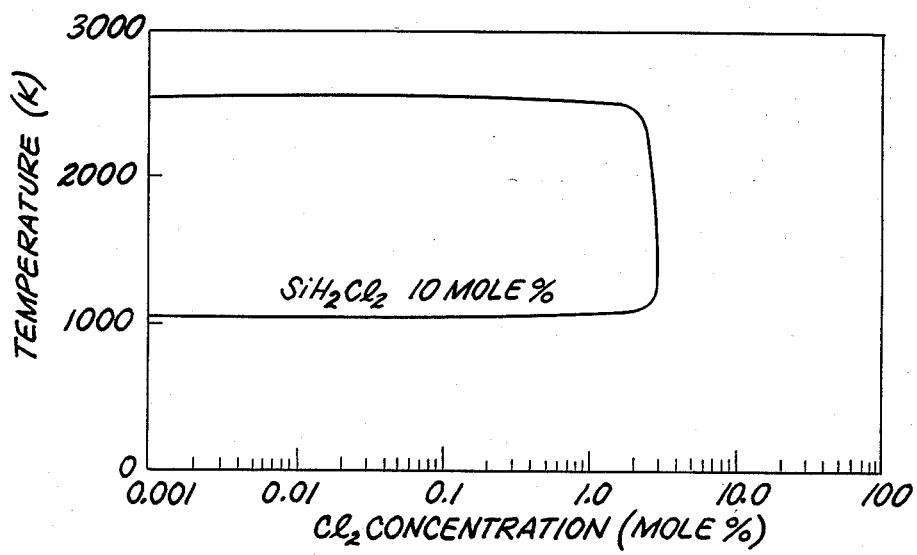
FIG. 9 is a plot of loci at which the homogeneous nucleation is 1 silicon nucleus/cm$^3$/sec for $SiH_2Cl_2$ at different temperatures and concentrations of added $Cl_2$.
Figure 10:
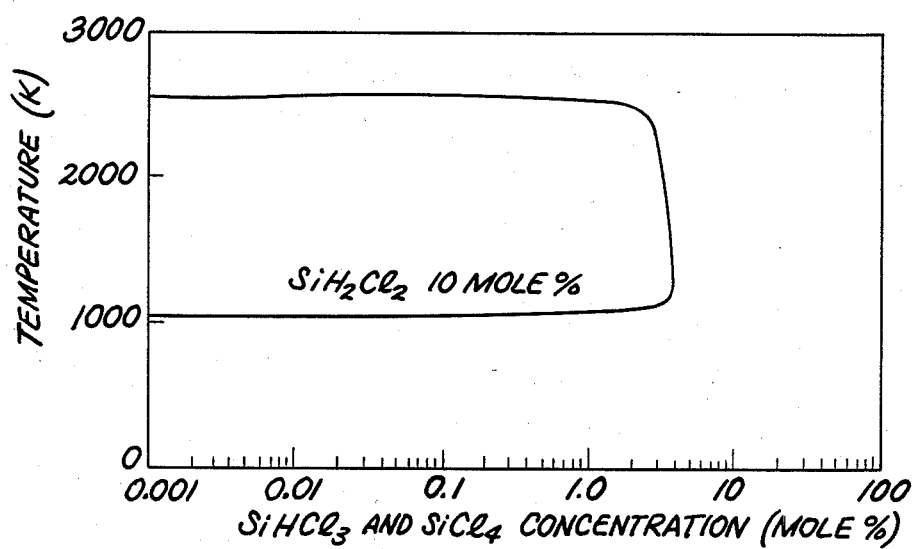
FIG. 10 is a plot of loci at which the homogeneous nucleation is 1 silicon nucleus/cm$^3$/sec for $SiH_2Cl_2$ at different temperatures and concentrations of added $SiHCl_3$ and $SiCl_4$.

When attempting to reduce the rate of homogeneous nucleation by the addition of halogen, the quantity of halogen that is necessary to provide such a decrease is dependent on the quantity of halogen within the feedstock of silane homologs to be pyrolyzed. A feedstock principally comprised of $SiX_4$, wherein X is halogen, will show a decrease in the homogeneous nucleation rate at temperatures below 1700 Kelvin upon the addition of almost any quantity of halogen, no matter how small. This is due to the large quantity of halogen which is already within the feedstock of silane homologs. Feedstocks which contain no halogen, such as those comprised of $SiH_4$, require a quantity of halogen which is at least equi-molar to the silane homolog content of said feedstock to provide a decrease in the homogeneous nucleation rate, as shown in FIGS. 3-7. Where the silane homologs within the feedstock contain more halogen atoms, the quantity of halogen necessary to decrease the homogeneous nucleation rate is reduced. For example, FIGS. 8-10 illustrate that feedstocks comprised of $SiH_2X_2$, wherein X is halogen, show a reduction in the homogeneous nucleation rate upon the addition of halogen in quantities as small as 0.1 the molar concentration of the silane homolog in said feedstock. To insure a decrease in the homogeneous nucleation rate during the pyrolysis of silane homologs, it is preferable to add halogen in a quantity at least equi-molar to the silane homolog content of said feedstock at temperatures both above and below 1700 Kelvin. When more information is known about the feedstock composition and pyrolysis temperature, smaller quantities of halogen may be desirable. The actual quantity of halogen to be introduced is also dependent on the rate of homogeneous nucleation that is desired.

In the commercial production of solid silicon, pyrolysis temperatures in the range of 800-1500 Kelvin and silane homolog concentrations within the range of 0.1 to 20 mole % of a feedstock are utilized. The temperatures within this range fall below the melting point of silicon, which is about 1700 Kelvin. At these temperatures, the homogeneously nucleated silicon produced during the pyrolysis reaction is in a particulate solid form (powder) and has the deleterious effects on the silicon product described above. At temperatures above 1700 Kelvin, the homogeneously nucleated silicon produced in a liquid state and may be in the form of a liquid aerosol. Although reducing the production of homogeneously nucleated silicon at temperatures above 1700 Kelvin is not significant in the existing commercial processes for producing merchant silicon, methods described herein which provide these results are within the scope of this invention.

As previously indicated, it is desirable to maintain a rate of homogeneously nucleated silicon production equal to the onset rate of one silicon nucleus/$cm^3$/sec and less when pyrolyzing silane homologs. FIGS. 3-10 illustrate that where the halogen concentration within the feedstock is significantly greater than the concentration of silane homologs, the rate of homogeneously nucleated silicon production in the gas phase will be below the onset rate at any pyrolysis temperature within the range of 800-3000 Kelvin. However, such high concentrations may be undesirable in commercial processes due to reduced deposition rate of high purity silicon caused by etching. It is preferable to utilize values for silane homolog concentration, halogen concentration and pyrolysis temperature which correspond to loci on or about the curves in FIGS. 3-10. These loci proscribe the minimum concentration of halogen which reduces the production of homogeneously nucleated silicon in the gas phase at or below the onset rate for a particular temperature. Therefore, etching is at a minimum at such values. To define these preferred values, it is necessary to refer to the curves in FIGS. 3-10. These values cannot be described in general terms since they are dependent on many variables. In addition, the accuracy of the definition is very important since the rate of production of homogeneous nucleated silicon in the gas phase can increase rapidly with small changes in these values.

Although the curves of FIGS. 3-7 illustrate additions of halogen to a feedstock comprised of $SiH_4$, these curves can also be used to define process conditions for reducing the rate of homogeneous nucleation of particulate solid and liquid silicon in a gaseous phase to less than 1 silicon nucleus/$cm^3$/sec for feedstocks comprised of $SiH_3X$, $SiH_2X_2$ and mixtures thereof, wherein X is halogen. The values for temperature and halogen concentration wherein the rate of homogeneous nucleation is equal to the onset rate for these two silane homologs fall within the curves of FIGS. 3-7. This is illustrated in FIG. 2 and can also be shown when comparing FIG. 9 (SiH$_2$Cl$_2$ feedstock, Cl$_2$ addition) to FIG. 4 (SiH$_4$ feedstock Cl$_2$ addition). As a result, the rate of homogeneous nucleation for these two silane homologs at conditions on or about the curves of FIGS. 3–7 will be less than the onset rate, since these silane homologs already contain a quantity of halogen.

Silane homologs of the formula SiX$_4$ and SiHX$_3$ would also provide a rate of homogeneously nucleated silicon production in the gas phase less than the onset rate at most of the points along the curves of FIGS. 3–7. However, some inconsistencies are expected of these two silane homologs, particularly at temperatures above 1700 Kelvin. The conditions dictated by the curves of FIGS. 3–7 far exceed what is necessary to reduce the production of homogeneously nucleated silicon in the gas phase for SiX$_4$ and SiHX$_3$ below the onset rate. Therefore, significant loss of high-purity silicon may occur due to etching.

Although the halogens added to the feedstocks in FIGS. 3–6 were in the form of HCl, Cl$_2$, SiCl$_4$, and SiHCl$_3$, respectively; the corresponding fluorine compound can be used in the conditions prescribed to provide a rate of homogeneous nucleation less than the onset rate. The corresponding fluorine compounds, i.e. HF, F$_2$, SiF$_4$ and SiHF$_3$, are more reactive than the corresponding chlorine-containing compounds used in FIGS. 3–6. Therefore, values for temperature and fluorine content where the rate of homogeneous nucleation is equal to the onset rate fall within the curves of FIGS. 3–7 and utilizing the corresponding fluorine-containing species under the conditions prescribed by the curves of FIGS. 3–6 will provide a rate of homogeneous nucleation below the onset rate.

The corresponding iodine and bromine containing species are less reactive than the chlorine containing compounds used in FIGS. 3–6. Therefore, these bromine and iodine species (HBr, HI, Br$_2$, I$_2$, SiHBr$_3$, SiHI$_3$, SiI$_4$, SiBr$_4$) cannot be expected to provide a rate of homogeneous nucleation equal to the onset rate at conditions prescribed by the loci of curves of FIGS. 3–6.

To utilize the curves in FIGS. 3–10 to pyrolyze silane homologs efficiently, silane homologs are selected from the group consisting of SiH$_4$, SiH$_3$X, SiH$_2$X$_2$ and mixtures thereof, wherein X is halogen and preferably chlorine. These silane homologs are diluted with hydrogen to provide a feedstock for the pyrolysis reaction. The concentration of silane homologs preferably falls within the range of about 0.001 to 10 mole percent of said feedstock. Chlorine or fluorine is then added in a form corresponding to the species utilized in FIGS. 3–10. These are limited to the species HCl, HF, Cl$_2$, F$_2$, SiCl$_4$, SiF$_4$, SiHCl$_3$ and SiHF$_3$. The chlorine species are preferred. The concentration of these species preferably range from about 0.001 to 90 mole percent of said feedstock. A pyrolysis temperature is selected from within the range of 800–3000 Kelvin. This temperature also corresponds to loci on or outside of the appropriate curve of the appropriate Figure selected from FIGS. 3–10. The appropriate Figure being the one in which the corresponding chlorine-containing species was added. The apropriate curve being one that corresponds to a concentration of silane homolog which is greater than or equal to the actual concentration of silane homolog in the feedstock. It is preferable to select a temperature which corresponds to loci on these curves to minimize the loss of high-purity silicon to etching.

Once the pyrolysis temperature, silane homolog concentration and halogen concentration are selected, the feedstock is pyrolyzed under these conditions. Should the concentration of silane homolog and halogen vary with the pyrolysis medium during reaction, the temperature can be varied to correspond to loci on and outside of a new concentration curve.

EXPERIMENTAL

The rate of homogeneous nucleation of particulate and liquid silicon in the gas phase is calculated herein by the application of classical nucleation theory. This theory treats the gas phase as containing a distribution of "clusters" of gas molecules wherein each cluster can be diminished in size by evaporation of a monomer or can be increased in size by condensation of a monomer molecule thereon. A "cluster" is a group of gas phase molecules (monomers) associated together in a single small body from which the evaporation rate of monomer is greater than the condensation rate of monomer. Therefore, it will disappear (cease to exist) after a period of time. Clusters which contain the maximum number of molecules are of a "critical size" because the addition of a single gas phase monomer creates a stable nucleus. From this nucleus, the rate at which monomer molecules evaporate is lower than the rate at which monomer molecules condense. The future existence of the nucleus is in the form of a liquid or solid is assured. The following equation expresses this idea in mathematical terms:

Rate of homogeneous nucleation of silicon
(particulate solid and liquid) in the gas phase = awn
exp ($\Delta G_{cs}/kT$)

The quantity n exp($\Delta G_{cs}/kT$) represents the concentration of clusters of a critical size within the gas. The quantity aw represents the condensation rate of monomer molecules on a cluster.

The value k is Boltzman's constant and the accommodation coefficient, a, is equal to unity. The concentration of the gas phase monomer, n, and the temperature, T, are predetermined quantities. To determine the values for G$_{cs}$, the free energy of formation of critical size clusters, and w, the condensation rate of monomer molecules on critical size clusters, the following equations are utilized.

$$\Delta G_{cs} = \frac{16\pi}{3} \frac{\sigma^3}{\Delta G_v^2}$$

where $\Delta G_v = \frac{-kT}{V_e} \ln(P/P_o)$ = free energy per unit volume of condensed phase $\omega = 4\pi r_{cs}^2 P(2\pi mkT)^{-\frac{1}{2}}$ where $r_{cs} = \frac{-2\sigma}{\Delta G_v}$ = radius of a critical size cluster To solve these equations, the following values are obtained from the literature.
(a) $\sigma$, the surface free energy per unit volume, C. L. Yaws et al, Solid State Technology 24, 87 (1981)
(b) V$_e$, the molar volume of the condensed phase
(c) m, the mass of one gas monomer of the condensing species (Si)
(d) P$_o$, the equilibrium vapor pressure of the monomer The partial pressure of silicon, P, is obtained from equilibrium calculations described by Herrick and Sanchez-Martinez, J. Electrochem. Soc. 131, 455 (1984), incorporated herein by reference. This value is related to the composition of the feedstock and is predetermined in much the same manner as temperature, T, and concentration of gas phase monomer, n. Controlling the quantity of halogen significantly effects this value which, in turn, effects both the rate of condensation of monomer on clusters and the concentration of critical size clusters.

These equations were utilized to provide the curves in FIGS. 1 through 10 from varying pyrolysis temperature, silane homolog concentration and halogen concentration in the feedstock.

Figure 11:
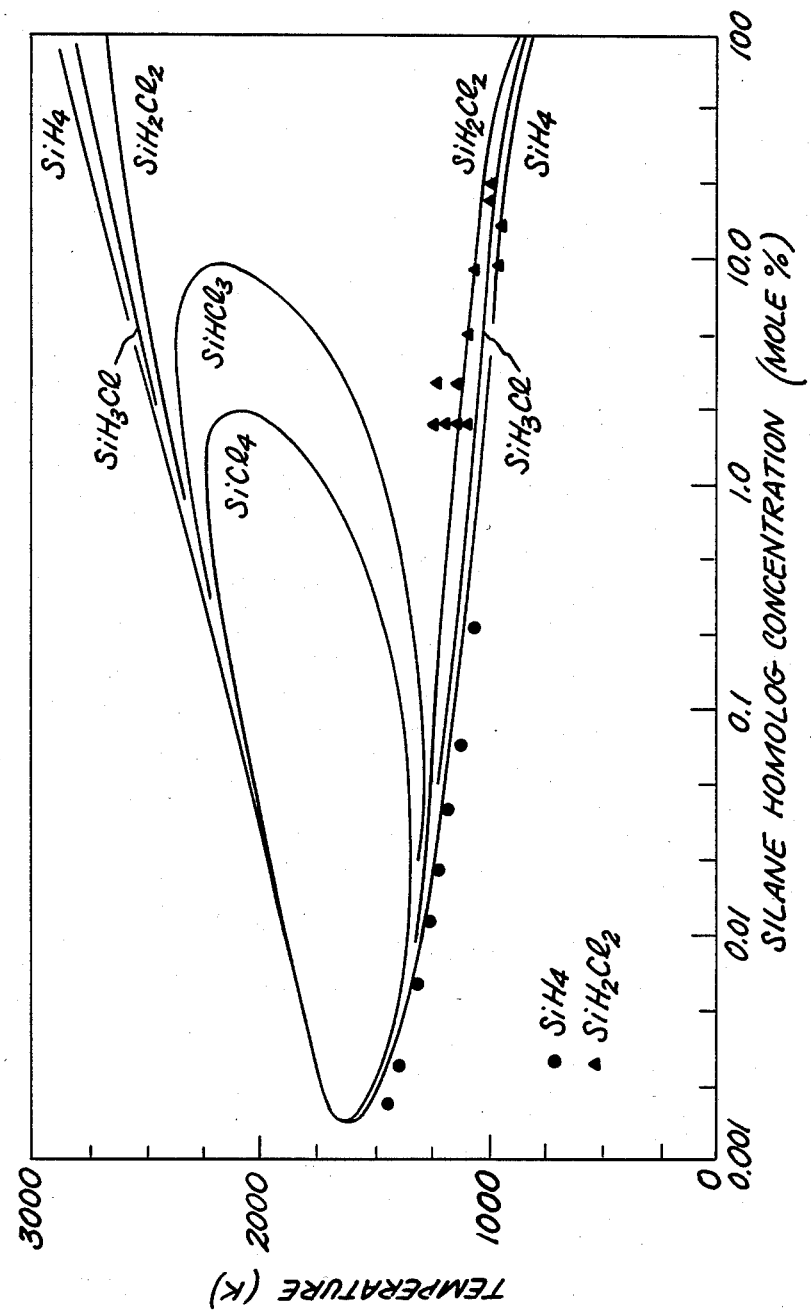
FIG. 11 is a plot of loci comparing values obtained by experiment and calculation for temperatures and concentration which provide a homogeneous nucleation rate of 1 silicon nucleus/cm$^3$/sec.

FIG. 11 compares the calculated values of FIG. 2 with values obtained by experiment.

These experiments illustrate the conditions in which the rate of homogeneous nucleation of particulate solid silicon in the gas phase is 1 silicon nucleus/cm$^3$/sec when pyrolyzing $SiH_4$ and $SiH_2Cl_2$ without the addition or removal of halogen. Points indicated by "o" were provided by F. C. Eversteijn, Phillips Res.Repts., 26, 134 (1971) for the pyrolysis of $SiH_4$. Points indicated by "Δ" for $SiH_2Cl_2$ were obtained by experiment in the following manner.

A quartz tube furnace having a 0.5" OD, 0.4" ID and a hot zone one foot long was connect to a small Ehrlenmeyer flask with a glass wool plug placed in a side port. This side port was connected to a scrubber to remove residual silane homolog.

Each of the gas mixtures comprised of hydrogen and $SiH_2Cl_2$ having silane homolog concentrations and flow rates as indicated in Table I were fed into the furnace. The furnace temperature was initially set too low to cause gas-phase silicon production for each of the gas mixtures. The temperature was increased ten degrees Kelvin at ten minute intervals until brown silicon powder was observed in the tube or glass wool. The temperature at which this occurred for each gas mixture is indicated in Table I and on FIG. 12.

TABLE I

Gas-Phase Silicon Production from Pyrolysis of $SiH_2Cl_2$

| Concentration $SiH_2Cl_2$ (mole %) | Flowrate (std. ml/s) | Temperature at Powder Formation (°K.) |
|---|---|---|
| 2 | 16.7 | 1078 |
| 2 | 16.7 | 1198 |
| 2 | 8.35 | 1148 |
| 2 | 8.35 | 1158 |
| 2 | 8.35 | 1138 |
| 2 | 8.35 | 1138 |
| 2 | 8.35 | 1108 |
| 3 | 16.7 | 1198 |
| 3 | 16.7 | 1108 |
| 3 | 8.35 | 1108 |
| 4 | 16.7 | 1088 |
| 4 | 16.7 | 1068 |
| 5 | 16.7 | 1058 |
| 10 | 16.7 | 918 |
| 10 | 16.7 | 1008 |
| 10 | 16.7 | 988 |
| 10 | 16.7 | 1008 |
| 10 | 8.35 | 1038 |
| 15 | 16.7 | 978 |
| 15 | 16.7 | 968 |
| 20 | 16.7 | 958 |
| 20 | 16.7 | 958 |

It is preferable to select a pyrolysis temperature on or about the loci of the curves within FIGS. 3–10 to minimize the loss of silicon deposited to etching. To define the important portions of the curves with greater particularity, the calculated values which provided these portions of the curves within FIGS. 3–10 are given below in Tables II through IX.

TABLE II

Figure 3:
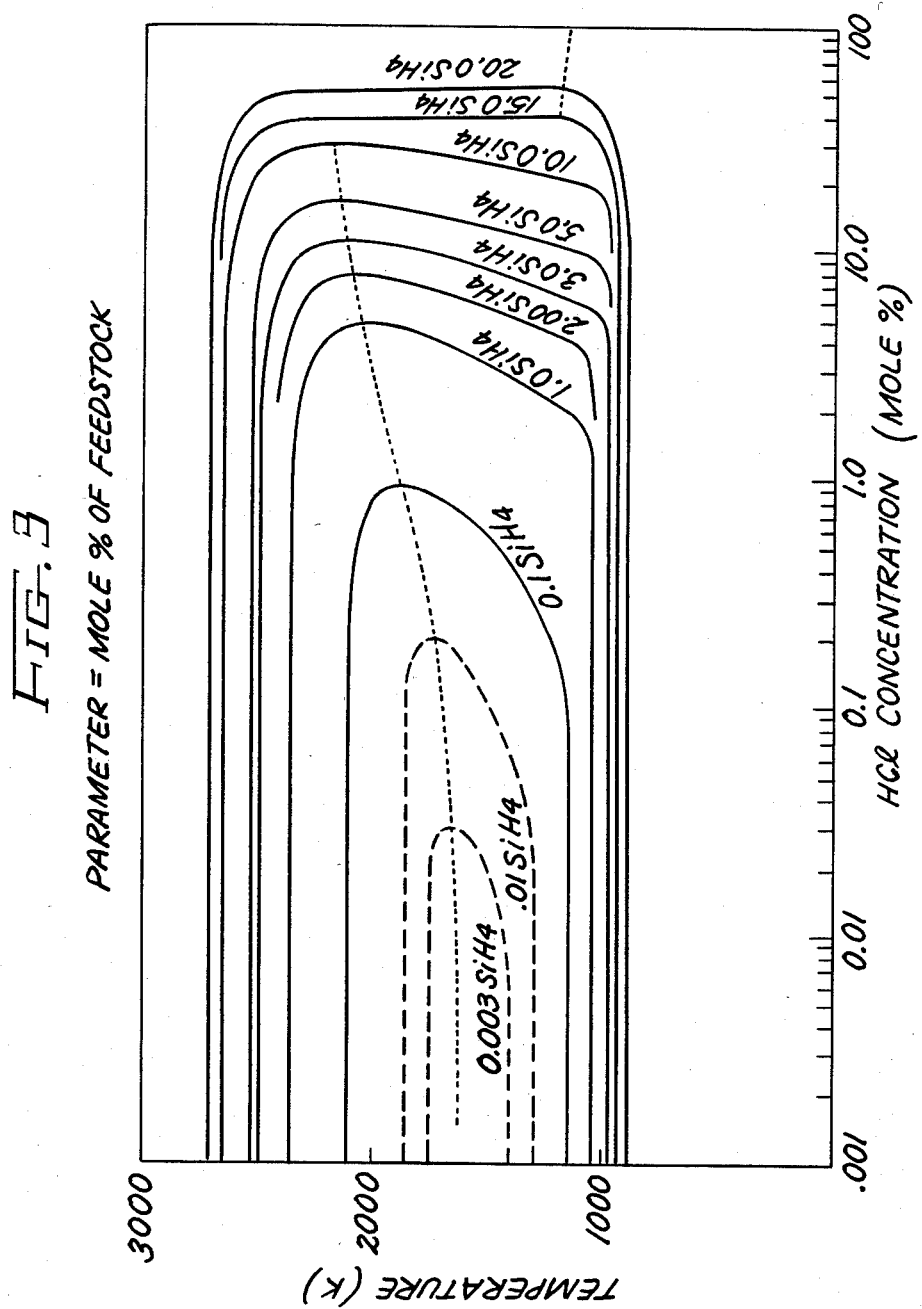
FIG. 3 is a plot of loci at which the homogeneous nucleation rate is 1 silicon nucleus/cm$^3$/sec for $SiH_4$ at different temperatures and concentrations of added HCl.

Samples of Loci in FIG. 3

| Concentration of $SiH_4$ (mole %) | Concentration of HCL (mole %) | Pyrolysis Temperature (°K.) | |
|---|---|---|---|
| | | Low | High |
| 1.0 | 0.0 | 1046 | 2362 |
| 1.0 | 2.0 | 1148 | 2331 |
| 1.0 | 3.0 | 1434 | 2299 |
| 1.0 | 4.0 | 1704 | 2242 |
| 1.0 | 4.87 | 2057 | 2057 |
| 5.0 | 0.0 | 992 | 2536 |
| 5.0 | 5.0 | 1019 | 2536 |
| 5.0 | 10.0 | 1071 | 2482 |
| 5.0 | 12.5 | 1200 | 2438 |
| 5.0 | 15.0 | 1764 | 2364 |
| 5.0 | 16.0 | 1916 | 2310 |
| 5.0 | 16.88 | 2154 | 2154 |
| 10.0 | 0.0 | 971 | 2651 |
| 10.0 | 2.0 | 1040 | 2537 |
| 10.0 | 2.5 | 1120 | 2464 |
| 10.0 | 2.9 | 2980 | 2330 |
| 10.0 | 2.99 | 2187 | 2187 |

TABLE III

Figure 4:
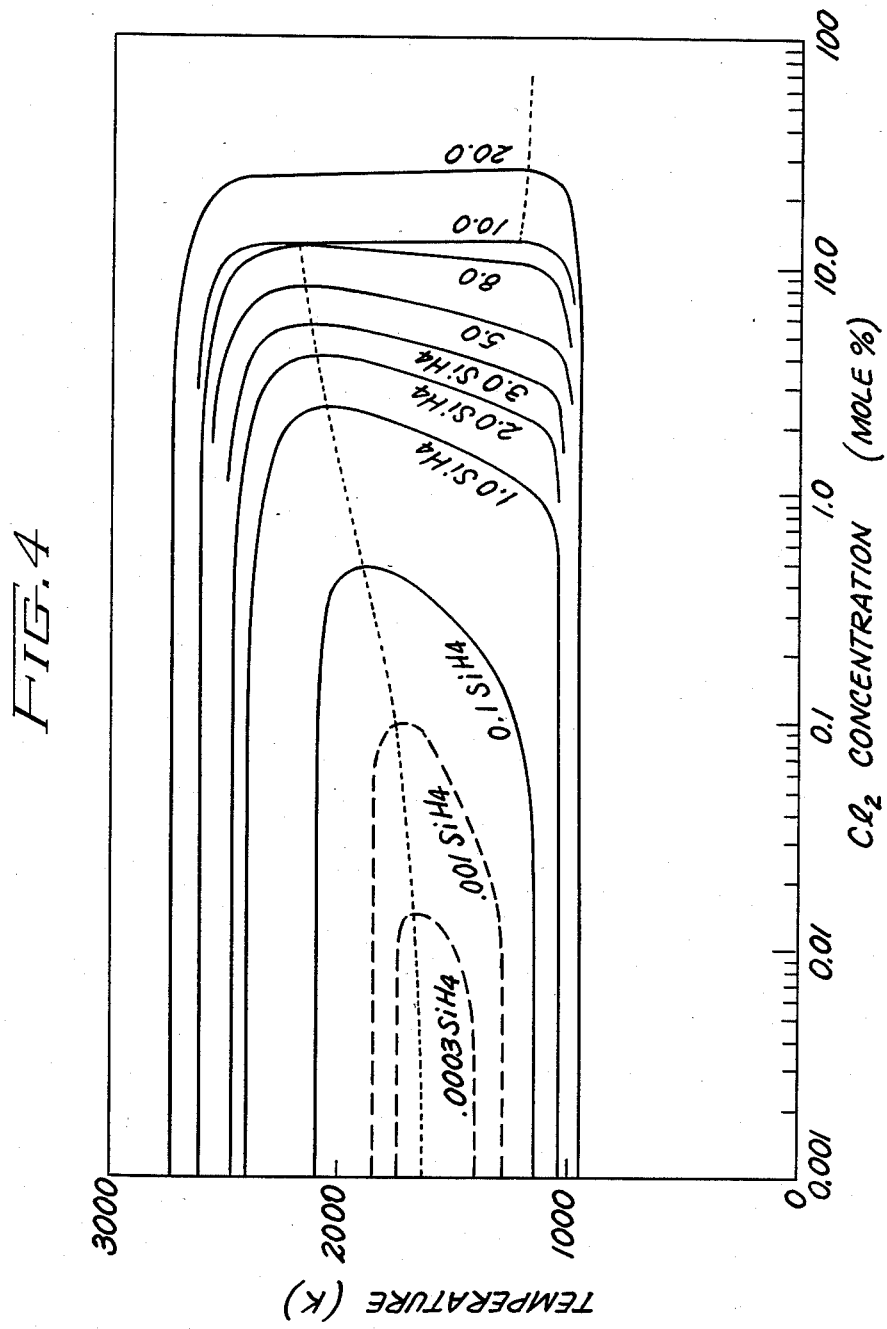
FIG. 4 is a plot of loci at which the homogeneous nucleation rate is 1 silicon nucleus/cm$^3$/sec for $SiH_4$ at different temperatures and concentrations of added $Cl_2$.

Samples of Loci in FIG. 4

| Concentration of $SiH_4$ (mole %) | Concentration of $Cl_2$ (mole %) | Pyrolysis Temperature (°K.) | |
|---|---|---|---|
| | | Low | High |
| 1.0 | 0.0 | 1046 | 2362 |
| 1.0 | 1.0 | 1149 | 2331 |
| 1.0 | 1.5 | 1434 | 2298 |
| 1.0 | 2.0 | 1705 | 2242 |
| 1.0 | 2.3 | 1892 | 2172 |
| 1.0 | 2.43 | 2057 | 2057 |
| 8.0 | 0.0 | 970 | 2610 |
| 8.0 | 8.0 | 1050 | 2520 |
| 8.0 | 10.0 | 1140 | 2458 |
| 8.0 | 12.0 | 1974 | 2318 |
| 8.0 | 12.40 | 2177 | 2177 |
| 10.0 | 0.0 | 971 | 2651 |
| 10.0 | 10.0 | 1042 | 2536 |
| 10.0 | 12.0 | 1092 | 2482 |
| 10.0 | 13.0 | 1213 | 1213 |

TABLE IV

Figure 5:
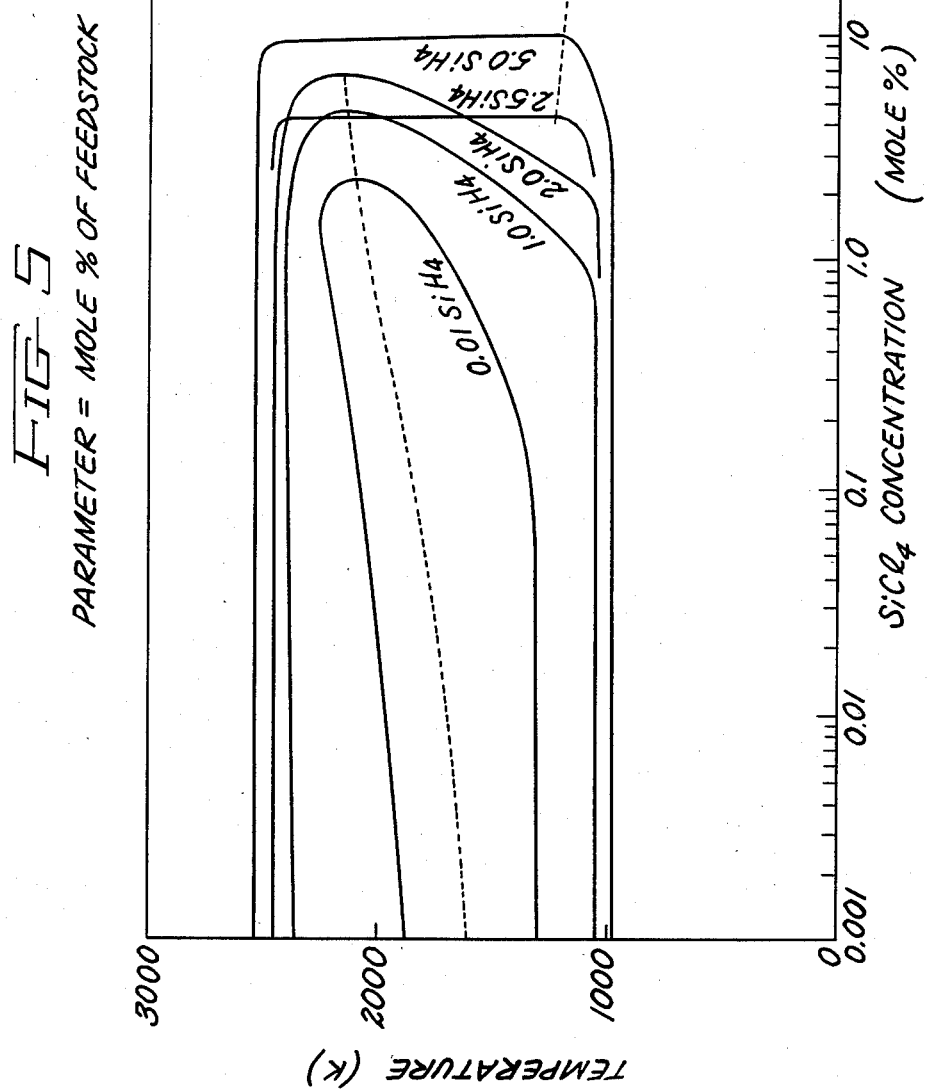
FIG. 5 is a plot of loci at which the homogeneous nucleation rate is 1 silicon nucleus/cm$^3$/sec for $SiH_4$ at different temperatures and concentrations of added $SiCl_4$.

Samples of Loci in FIG. 5

| Concentration of $SiH_4$ (mole %) | Concentration of $SiCl_4$ (mole %) | Pyrolysis Temperature (°K.) | |
|---|---|---|---|
| | | Low | High |
| 1.0 | 0.0 | 1046 | 2362 |
| 1.0 | 1.0 | 1116 | 2377 |
| 1.0 | 2.0 | 1438 | 2392 |
| 1.0 | 3.0 | 1696 | 2366 |
| 1.0 | 4.0 | 1916 | 2308 |
| 1.0 | 4.68 | 2162 | 2162 |

TABLE V

Figure 6:
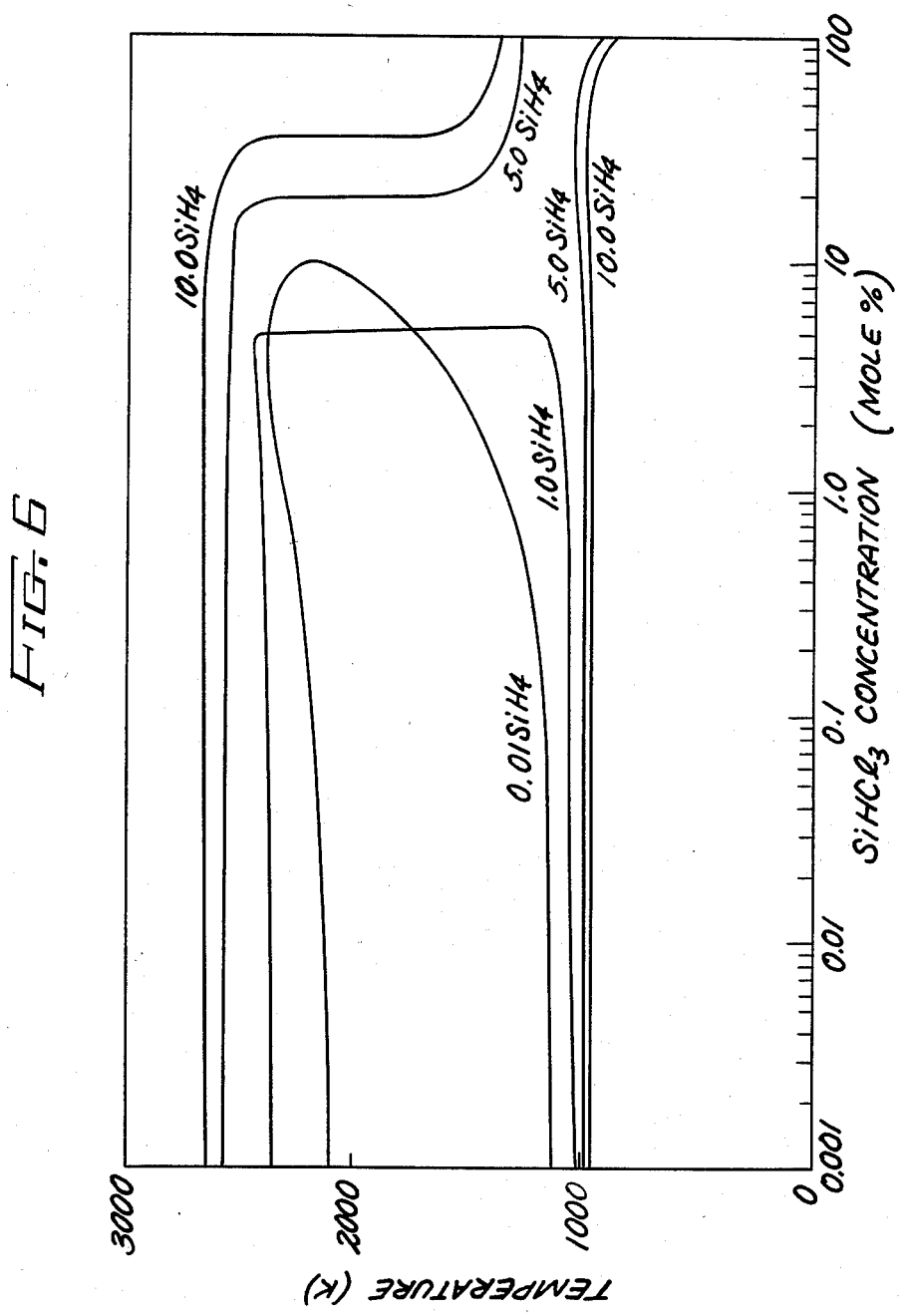
FIG. 6 is a plot of loci at which the homogeneous nucleation rate is 1 silicon nucleus/cm$^3$/sec for $SiH_4$ at different temperatures and concentrations of added $SiHCl_3$.

Samples of Loci in FIG. 6

| Concentration of $SiH_4$ (mole %) | Concentration of $SiHCl_3$ (mole %) | Pyrolysis Temperature (°K.) | |
|---|---|---|---|
| | | Low | High |
| 1.0 | 0.0 | 1046 | 2362 |
| 1.0 | 2.0 | 1095 | 2437 |

TABLE V-continued

Samples of Loci in FIG. 6

| Concentration of SiH$_4$ (mole %) | Concentration of SiHCl$_3$ (mole %) | Pyrolysis Temperature (°K.) | |
|---|---|---|---|
| | | Low | High |
| 1.0 | 3.0 | 1116 | 2445 |
| 1.0 | 4.0 | 1140 | 2448 |
| 1.0 | 5.0 | 1174 | 2445 |
| 1.0 | 5.64 | 1239 | 1239 |
| 5.0 | 0.0 | 992 | 2563 |
| 5.0 | 1.5 | 1031 | 2533 |
| 5.0 | 2.5 | 1041 | 1448 |
| 5.0 | 3.5 | 1046 | 1360 |
| 5.0 | 5.5 | 1038 | 1310 |
| 5.0 | 7.5 | 1010 | 1298 |
| 5.0 | 9.5 | 950 | 1294 |
| 10.0 | 0.0 | 971 | 2651 |
| 10.0 | 5.0 | 981 | 2656 |
| 10.0 | 10.0 | 986 | 2644 |
| 10.0 | 15.0 | 988 | 2626 |
| 10.0 | 20.0 | 990 | 2602 |
| 10.0 | 30.0 | 992 | 2534 |
| 10.0 | 40.0 | 990 | 1588 |
| 10.0 | 50.0 | 984 | 1468 |
| 10.0 | 70.0 | 964 | 1400 |
| 10.0 | 90.0 | 908 | 1370 |

TABLE VI

Figure 7:
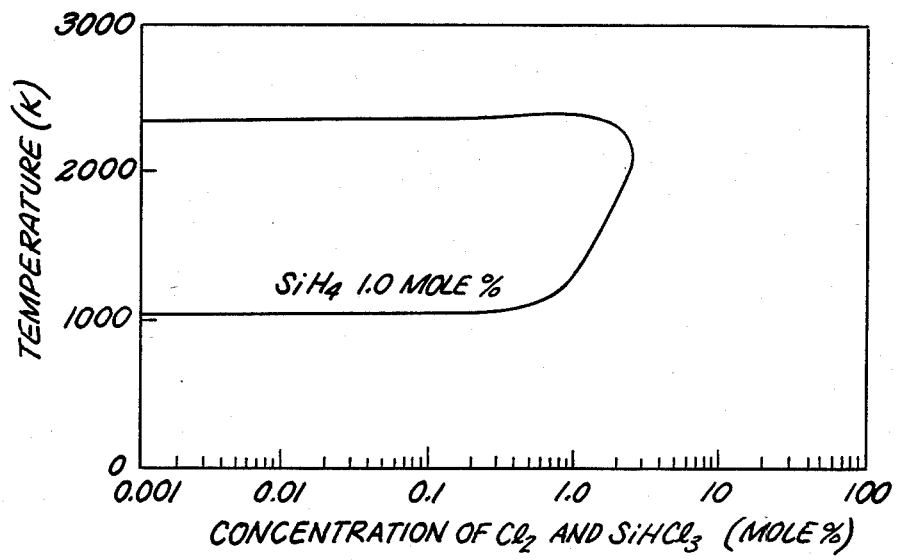
FIG. 7 is a plot of loci at which the homogeneous nucleation rate is 1 silicon nucleus/cm$^3$/sec for $SiH_4$ at different temperatures and concentrations of added $Cl_2$ and $SiHCl_3$.

Samples of Loci in FIG. 7

| Concentration of SiH$_4$ (mole %) | Concentrations of SiHCl$_3$ and Cl$_2$ (mole %) | Pyrolysis Temperature (°K.) | |
|---|---|---|---|
| | | Low | High |
| 1.0 | 0.0 | 1046 | 2362 |
| 1.0 | 0.5 | 1097 | 2382 |
| 1.0 | 1.0 | 1279 | 2375 |
| 1.0 | 1.5 | 1582 | 2354 |
| 1.0 | 2.0 | 1792 | 2314 |
| 1.0 | 2.5 | 2032 | 2217 |
| 1.0 | 2.59 | 2135 | 2135 |

TABLE VII

Samples of Loci in FIG. 8

| Concentration of SiH$_2$Cl$_2$ (mole %) | Concentrations of HCl and Cl$_2$ (mole %) | Pyrolysis Temperature (°K.) | |
|---|---|---|---|
| | | Low | High |
| 10.0 | 0.0 | 1042 | 2541 |
| 10.0 | 0.5 | 1054 | 2519 |
| 10.0 | 1.0 | 1073 | 2499 |
| 10.0 | 1.5 | 1104 | 2474 |
| 10.0 | 1.994 | 1214 | 1214 |

TABLE VIII

Samples of Loci in FIG. 9

| Concentration of SiH$_2$Cl$_2$ (mole %) | Concentration of Cl$_2$ (mole %) | Pyrolysis Temperature (°K.) | |
|---|---|---|---|
| | | Low | High |
| 10.0 | 0.0 | 1042 | 2541 |
| 10.0 | 1.0 | 1060 | 2513 |
| 10.0 | 2.0 | 1092 | 2483 |
| 10.0 | 3.0 | 1214 | 1214 |

TABLE IX

Samples of Loci in FIG. 10

| Concentration of SiH$_2$Cl$_2$ (mole %) | Concentrations of SiHCl$_3$ and SiCl$_2$ (mole %) | Pyrolysis Temperature (°K.) | |
|---|---|---|---|
| | | Low | High |
| 10.0 | 0.0 | 1042 | 2541 |
| 10.0 | 1.0 | 1057 | 2515 |
| 10.0 | 2.0 | 1076 | 2484 |
| 10.0 | 4.2 | 1192 | 1192 |

What is claimed is:

1. A method of decreasing the homogeneous nucleation of particulate solid silicon in the gas phase during the pyrolysis of silane homologs and hydrogen mixtures thereof at temperatures below about 1700 Kelvin, said method comprising:
   (a) adding halogen to a gaseous feedstock comprised of silane homologs, in the form of one or more members of the group consisting of HI, HBr, HF, Cl$_2$, Br$_2$, F$_2$, I$_2$, SiX$_3$H and SiX$_4$, wherein X is halogen in a quantity at least equi-molar to the silane homolog content of said feedstock, with the quantity of SiX$_3$H added to the feedstock being limited to less than about 30 mole percent of said feedstock and
   (b) pyrolyzing the silane homologs within the feedstock of step (a).

2. A method as in claim 1 wherein the feedstock is comprised of silane homologs selected from the group consisting of SiH$_4$, SiH$_3$Cl, SiH$_2$Cl$_2$ and the halogen added is in the form of Cl$_2$, SiHCl$_3$, SiCl$_4$ and mixtures thereof.

3. A method as in claim 2 wherein the concentration of silane homologs within said feedstock is within the range of about 0.1 mole percent to about 20 mole percent of said feedstock.

4. A method as in claim 3 wherein the total concentration of Cl$_2$, SiHCl$_3$ and SiCl$_4$ added to the feedstock is within the range of about 1 to 30 mole percent of said feedstock.

5. A method as in claim 4 wherein the pyrolysis temperature falls within the range of about 800 to about 1700 Kelvin.

6. A method of decreasing the homogeneous nucleation of liquid silicon in the gas phase during the pyrolysis of silane homologs and hydrogen mixtures thereof at temperatures above about 1700 Kelvin, said method comprising:
   (a) adding halogen to a gaseous feedstock comprised of silane homologs selected from the group consisting of SiH$_4$, SiH$_3$X, SiH$_2$X$_2$ and mixtures thereof in the form of one or more members of the group consisting of HI, HBr, HF, Cl$_2$, I$_2$, Br$_2$, F$_2$, SiX$_4$ and SiH$_3$X$_3$ wherein X is halogen, in a concentration at least equi-molar to the silane homolog content of said feedstock, with the quantities of SiHX$_3$ added being greater than about 10 mole percent of said feedstock and the quantities of SiX$_4$ added being greater than about 2 mole percent of said feedstock and
   (b) pyrolyzing the silane homologs within the feedstock of step (a).

7. A method as in claim 6 wherein the feedstock is comprised of one or more members of the group consisting of SiH$_4$, SiH$_3$Cl, SiH$_2$Cl$_2$, and the halogen added is in the form of Cl$_2$, SiHCl$_3$, SiCl$_4$ and mixtures thereof.

8. A method as in claim 5 wherein the concentration of silane homologs comprising said feedstock falls within the range of about 0.1 mole percent to about 20 mole percent of said feedstock.

9. A method as in claim 6 wherein the total concentration of $Cl_2$, $SiHCl_3$ and $SiCl_4$ added to the feedstock falls within the range of about 1 mole percent to about 30 mole percent of said feedstock.

10. A method of decreasing the homogeneous nucleation of particulate solid and liquid silicon in the gaseous phase during the pyrolysis of silane homologs and hydrogen mixtures thereof having the formula $SiH_2X_2$, wherein X is halogen, said method comprising the steps of
   (a) adding halogen to a gaseous feedstock comprised of silane homologs having the formula $SiH_2X_2$ in the form of one or more members of the group consisting of HF, HI, HBr, $Cl_2$, $Br_2$, $I_2$, $F_2$, $SiHX_3$ and $SiX_4$, wherein X is halogen, in a concentration within the range of about 0.1 to 1.0 the molar concentration of the silane homologs in said feedstock and
   (b) pyrolyzing the silane homologs within the feedstock of step (a).

11. A method as in claim 10 wherein the silane homolog is $SiH_2Cl_2$ and the halogen added to the feedstock is in the form of $Cl_2$, $SiHCl_3$, $SiCl_4$ and mixtures thereof.

12. A method of reducing the homogeneous nucleation of particulate solid and liquid silicon in the gaseous phase to one silicon nucleus/$cm^3$/sec and less when pyrolyzing silane homologs comprising:
   (a) selecting silane homologs from the group consisting of $SiH_4$, $SiH_3X$, $SiH_2X_2$ and mixtures thereof, wherein X is halogen,
   (b) diluting the silane homologs of step (a) with hydrogen to provide a gaseous feedstock having a concentration of silane homologs in the range of about 0.001 to 20 mole percent,
   (c) adding a member of the group consisting of $Cl_2$ and $F_2$ in a concentration with the range of about 0.001 to 90 mole percent of said feedstock,
   (d) selecting a pyrolysis temperature from a group of values within the range of 800 to 3000 K. which correspond to loci on and outside of one or more curves of FIG. 4, said curves corresponding to concentrations of silane homologs which are greater than and equal to the concentration of silane homologs in step (b) and
   (e) pyrolyzing the feedstock of step (c) at said pyrolysis temperature.

13. A process as in claim 12 wherein the pyrolysis temperature is additionally limited to values corresponding to loci on a curve selected from FIG. 4, the selected curve corresponding to the lowest $SiH_4$ concentration which is greater than or equal to the concentration of silane homologs in step (b).

14. A method of reducing the homogeneous nucleation of particulate solid and liquid silicon in the gaseous phase to 1 silicon nucleus $cm^3$/sec and less when pyrolyzing silane homologs comprising
   (a) selecting silane homologs from the group consisting of $SiH_4$, $SiHX_3$, $SiH_2X_2$ and mixtures thereof, wherein X is halogen;
   (b) diluting the silane homologs of step (a) with hydrogen to provide a gaseous feedstock having a concentration of silane homologs in the range of about 0.001 to 20 mole percent;
   (c) adding a member of the group consisting of HCl, and HF in a concentration within the range of about 0.001 to 90 mole percent of said feedstock;
   (d) selecting a pyrolysis temperature from a group of values within the range of 800 to 3000 K. which corresponds to a loci on and outside of one or more curves of FIG. 3, said curves corresponding to concentrations of silane homologs which are greater than and equal to the concentration of silane homologs in step (b) and
   (e) pyrolyzing the feedstock of step (c) at said pyrolysis temperature.

15. A process as in claim 14 wherein the pyrolysis temperature is additionally limited to values corresponding to loci on a curve selected from FIG. 3, the selected curve corresponding to the lowest $SiH_4$ concentration which is greater than or equal to the concentration of silane in step (b).

16. A method of reducing the homogeneous nucleation of particulate solid and liquid silicon in the gaseous phase to 1 silicon nucleus/$cm^3$/sec and less when pyrolyzing silane homologs comprising
   (a) selecting silane homologs from the group consisting of $SiH_4$, $SiH_3Cl$, $SiH_2Cl_2$, $SiH_2F_2$, $SiH_3F$ and mixtures thereof,
   (b) diluting the silane homologs of step (a) with hydrogen to provide a gaseous feedstock having a concentration of silane homologs in the range of about 0.001 to 5 mole percent;
   (c) adding a silane homolog selected from the group consisting of $SiCl_4$ to said feedstock in a concentration within the range of about 0.001 to 30 mole percent of said feedstock;
   (d) selecting a pyrolysis temperature from the group of values within the range of 800 to 3000 K. which correspond to loci on and outside of the 0.01 $SiH_4$ curve of FIG. 5 for concentrations of silane homologs less than or equal to 0.01 mole percent of feedstock, loci on or outside of the 1.0 $SiH_4$ curve of FIG. 5 for concentrations of silane homologs less than or equal to 1 mole percent of feedstock; loci on and outside of the 2.0 $SiH_4$ curve of FIG. 5 for concentrations of silane homologs less than or equal to 2 mole percent of the feedstock; loci on and outside of the 2.5 $SiH_4$ curve of FIG. 5 for concentrations of silane homologs less than or equal to 2.5 mole percent of the feedstock and loci on and outside of the 5.0 $SiH_4$ curve of FIG. 5 for concentrations of silane homologs less than or equal to 5 mole percent of the feedstock; and
   (e) pyrolyzing the feedstock of step (c) at said pyrolyzing temperature.

17. A method as in claim 16 wherein the pyrolysis temperature is additionally limited to values corresponding to the loci on the 0.01 $SiH_4$, 1.0 $SiH_4$, 2.0 $SiH_4$, 2.5 $SiH_4$, and 5.0 $SiH_4$ curves of FIG. 5.

18. A method of reducing the homogeneous nucleation of particulate solid and liquid silicon in the gaseous phase to 1 silicon nucleus/$cm^3$/sec and less when pyrolyzing silane homologs comprising
   (a) selecting silane homologs from the group consisting of $SiH_4$, $SiH_3Cl$, $SiH_2Cl_2$, $SiH_3F$, $SiH_2F_2$ and mixtures thereof,
   (b) diluting the silane homologs of step (a) with hydrogen to provide a gaseous feedstock having a concentration of silane homologs in the range of about 0.01 to about 10 mole percent of feedstock;

(c) adding a silane homolog selected from the group consisting of $SiHCl_3$ and $SiHF_3$ to said feedstock in a concentration within the range of about 0.001 to 50 mole percent of said feedstock;

(d) selecting a pyrolysis temperature from the group of values within the range of 800 to 3000 K. which correspond to loci on or outside of the 0.01 $SiH_4$ curve of FIG. 6 for concentrations of silane homologs less than or equal to 0.01 mole percent of the feedstock; loci on or outside of the 1.0 $SiH_4$ curve of FIG. 6 for concentrations of silane homologs less than or equal to 1 mole percent of feedstock; loci on or outside of the 5.0 $SiH_4$ curves of FIG. 6 for concentrations of silane homologs less than or equal to 5 mole percent of feedstock and loci on or outside of the 10.0 $SiH_4$ curves of FIG. 6 for concentration of silane homologs less than or equal to 10 mole percent of feedstock, and (e) pyrolyzing the feedstock of step (c) at said pyrolysis temperature.

19. A method as in claim 18 wherein the pyrolysis temperature is additionally limited to values corresponding to the loci on the 0.01 $SiH_4$, 1.0 $SiH_4$, $SiOSiH_4$, and 10.0 $SiH_4$ curves of FIG. 6.

20. A method of reducing the homogeneous nucleation of particulate solid and liquid silicon in the gaseous phase of 1 silicon nucleus/cm³/sec and less when pyrolyzing $SiH_4$, said method comprising (a) diluting $SiH_4$ with hydrogen to provide a gaseous feedstock having a concentration of about 1 mole percent silane;

(b) adding $Cl_2$ and $SiHCl_3$ to said feedstock in a concentration within the range of 0.1 to 5 mole percent of said feedstock for both $Cl_2$ and $SiHCl_3$ (c) selecting a pyrolysis temperature from a group of values within the range of 800 to 3000 K. which correspond to loci on and outside of the curve of FIG. 8 and (d) pyrolyzing the feedstock of step (b) at said pyrolysis temperature.

21. A method of reducing the homogeneous nucleation of particulate solid and liquid silicon in the gaseous phase to 1 silicon nucleus/cm³/sec and less when pyrolyzing $SiH_2Cl_2$, said method comprising (a) diluting $SiH_2Cl_2$ with hydrogen gas to provide a gaseous feedstock having a concentration of about 10 mole percent $SiH_2Cl_2$;

(b) adding halogen to the feedstock in the form of a mixture selected from the group consisting of HCl plus $Cl_2$, $SiHCl_3$ plus $SiCl_4$, and $Cl_2$ in a concentration within the range of 0.1 to 5 mole percent of said feedstock for each constituent of said mixture;

(c) selecting a pyrolysis temperature from a group of values within the range of 800 to 3000 K. which correspond to loci on and outside of the curve of FIG. 8 for additions of HCl plus $Cl_2$, loci on and outside of the curve of FIG. 9 for the addition of $Cl_2$ and loci on and outside the curve of FIG. 10 for additions of $SiHCl_3$ plus $SiCl_4$ and (d) pyrolyzing the feedstock of step (b) at said pyrolysis temperature.

22. A method as in claim 21 where the pyrolysis temperatures are additionally limited to values corresponding to loci on the curves of FIGS. 8 through 10.

* * * * *